United States Patent [19]

Brown

[11] 4,098,966
[45] Jul. 4, 1978

[54] WELDED BATTERY ELEMENTS AND PROCESS

[75] Inventor: Richard C. Brown, Yorktown, Ind.

[73] Assignee: General Motors Corporation, Detroit, Mich.

[21] Appl. No.: 850,968

[22] Filed: Nov. 14, 1977

[51] Int. Cl.² .................. H01M 2/26; B23K 11/10
[52] U.S. Cl. .................. 429/161; 219/118; 219/91.23
[58] Field of Search .................. 429/161; 219/91, 93, 219/105, 117 R, 91.23

[56] References Cited

U.S. PATENT DOCUMENTS

| | | | |
|---|---|---|---|
| 2,293,247 | 8/1942 | Fentress | 219/93 |
| 2,883,443 | 4/1959 | Ruetschi et al. | 429/161 |
| 3,164,711 | 1/1965 | Shetterly | 219/118 |
| 3,640,775 | 2/1972 | Fitchman et al. | 429/161 |

*Primary Examiner*—Donald L. Walton
*Attorney, Agent, or Firm*—Lawrence B. Plant

[57] ABSTRACT

A battery including a plurality of electrochemically negatively and positively polarized elements interleaved with each other and a plurality of appropriate interelement battery separators, wherein each of the elements has a foil-like metal tab extending therefrom and welded to like tabs from other elements of like polarity and to the battery terminal. The outermost tab of each tab bundle is longer than the other tabs and the free end thereof is folded back against the remainder of the tab and on the outside of the tab bundle for engagement by the welding electrode during welding.

5 Claims, 4 Drawing Figures

WELDED BATTERY ELEMENTS AND PROCESS

BACKGROUND OF THE INVENTION

This invention relates to storage batteries particularly of the alkaline type and more specifically to the interelement and terminal connections therein. Shetterly U.S. Pat. No. 3,164,711 is typical of the type of batteries involved here. Shetterly discloses a nickel-cadmium battery having tabs from the several elements bundled together and projection welded to a depending portion of a battery terminal. The Shetterly technique requires unnecessary machining or the like to form the flat depending portion and welding projection and requires precise fixturing during welding to align the welding electrodes with the welding projections.

It is an object of the present invention to provide a simpler welded battery tab and terminal structure and process for making same. This and other objects and advantages of the present invention will become more readily apparent from the detailed description which follows.

In an effort to simplify the Shetterly terminal structure and assembly operation, it was initially proposed to spot weld the connecting tabs to a cylinder extension of the terminal instead of to the projection-bearing flat extension of Shetterly. Welding current concentration would thereby be effected by the line contact between the flat tab and the curved surface of the cylinder rather than by means of a discrete projection, ala Shetterly. It was found, however, that simultaneous spot welding of the tabs together and to the cylinder in this manner left the last or outermost tab in the bundle (i.e., at the distal extremity of the bundle furthest from the cylinder) poorly bonded to the penultimate tab such that the last tab was readily detachable from the bundle thereby rendering ineffective the end element in each cell. Attempts to first weld the tabs together and then as a unit to the cylinder resulted in the same problem. Moreover, attempts to better weld the outermost tab by increasing the welding power only caused metal expulsion from the weld and/or sticking of the tab to the welding electrodes.

BRIEF DESCRIPTION OF THE INVENTION

The present invention comprehends a bundle of foil-like (i.e., less than about 0.01 thick) connecting tabs for the active elements of a battery in which the tab(s) of each bundle remote from the terminal is (are) folded over and lie on the end of the bundle. The bundle is electrically welded, at its proximal extremity (i.e., end nearest the terminal), to a cylindrical portion of the battery terminal extending into the battery case. Folding over the end tab(s) promotes better bonding of the last tab in the bundle to the penultimate tab in the bundle and hence to the bundle itself.

A preferred embodiment of the present invention eliminates the aforesaid bonding problem by providing the outermost tab with sufficient excess length to permit its being folded back upon itself at least once, and preferably about three times, so as to space the portion of the outermost tab which is to be welded to the bundle from the face of the welding electrode. when this was done, the outermost tabs were strongly welded to the bundle without metal expulsion or sticking to the electrodes. The same effect can be achieved by bending the end of the penultimate tab over the top of the outermost tab to effect a single or multiple fold at the distal extremity of the bundle. Similarly, single folds in two or more tabs may be used to provide the desired spacing of the electrode from the stem of the outermost tab. This technique is useful to insure end tab bonding with simultaneous welding of the tabs and cylinder as well as with separate welding of the tabs and subsequent joining thereof to the cylinder.

The precise reason for the success achieved by folding over the outermost tab end is not completely understood. However, it is believed to result from the combined affects of the increased electrical resistance and thermal resistance achieved by the folds. In this regard, the folds increase the electrical resistance and hence the heat generated in the bundle while at the same time effectively reducing the chilling effects of the welding electrodes on the end tab.

DETAILED DESCRIPTION OF A PREFERRED EMBODIMENT OF THE INVENTION

Figure 1:
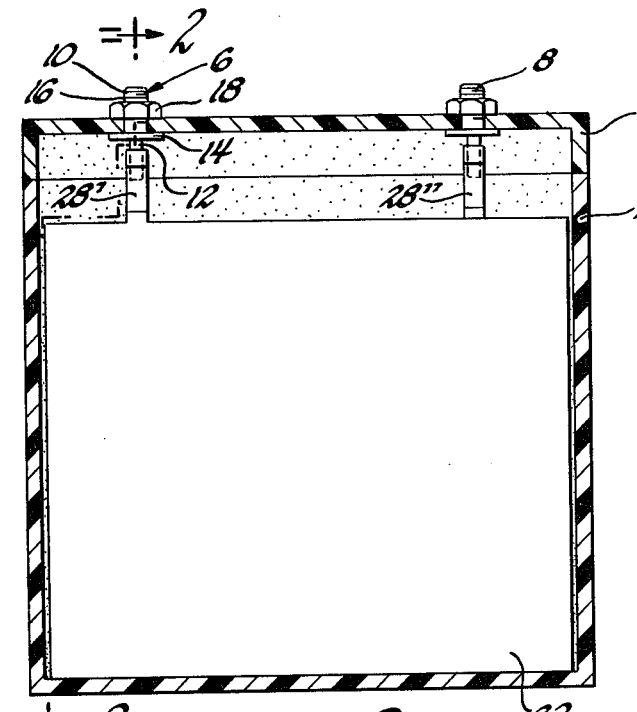
FIG. 1 illustrates a single cell battery in partially sectioned side elevation.

The battery shown in FIG. 1 is of the single cell variety and includes a case 2, a cover 4 and positive and negative terminals 6 and 8 respectively. The invention is equally applicable, of course, to multi-cell batteries as well. The terminals 6,8 each include an upper cylindrical portion 10, a lower depending cylindrical portion 12 and a flange 14 therebetween. The upper cylindrical portion 10 includes external threads 16 adapted to receive a nut 18. During assembly, the upper portion 10 is inserted through an aperture in the cover 4 and the nut 18 turned to draw the flange 14 tightly up against the underside of the cover 4 to sealingly secure the respective terminals to the cover 4. Appropriate gaskets, O-rings or sealants may be employed above the flange 14 or beneath the nut 18 for added sealing protection. The upper portion 10 includes an internally threaded socket 20 for externally connecting the battery to appropriate electrical circuits.

Figure 2:
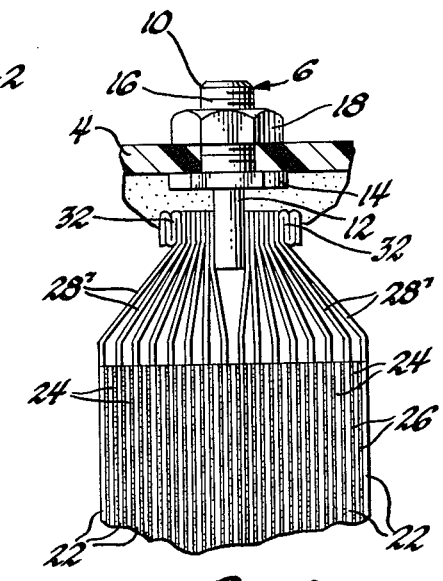
FIG. 2 is a sectioned, side elevational view in the direction 2—2 of FIG. 1.
Figure 3:
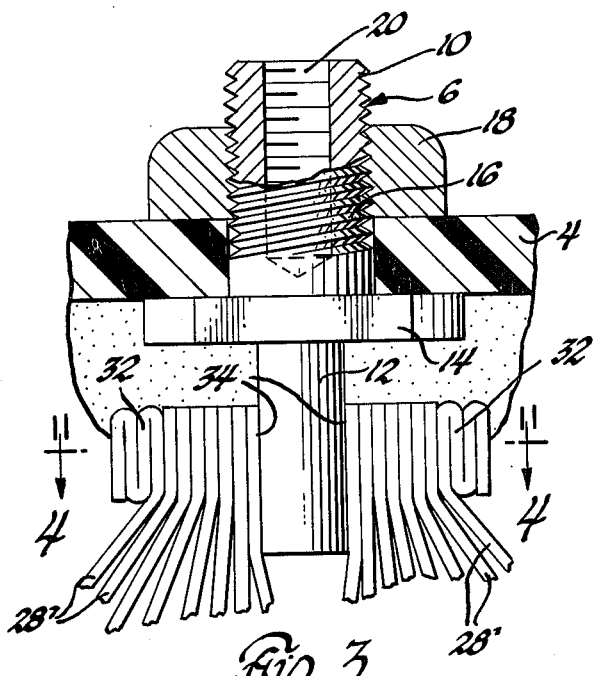
FIG. 3 is an enlarged view of the tab bundle and terminal portion of FIG. 2.
Figure 4:
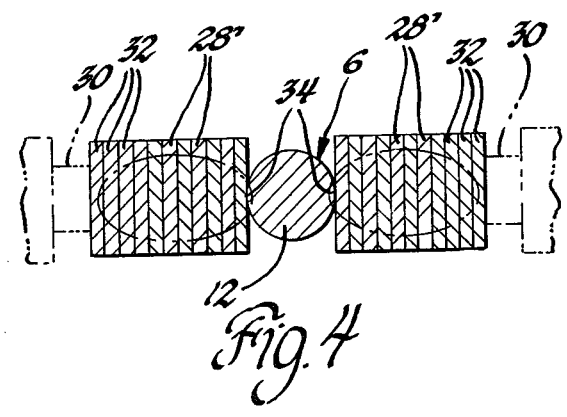
FIG. 4 is a view in the direction 4—4 of FIG. 3 including a phantom welding zone.

The electrochemically active elements of the cell are best shown in FIG. 2 and comprise a plurality of positively polarized (or polarizable) plates 22 interleaved with a plurality of negatively polarized (or polarizable) plates 24, but spaced therefrom by ion permeable, tree-suppressing separators 26 as are well known in the art. The positive plates 22 each include a foil-like metal connector tab 28' bonded thereto for connecting the several positive plates together electrically and to the positive terminal 6. In similar fashion, the negative plates 24 are joined to the negative terminal 8 by tabs 28". In multiple-element cells, the tab ends are bundled together at the terminals as shown and the tabs 28' and 28" vary in length depending on the location and thickness of the element each connects and are such that the tabs nearest to the terminal are shortest and those furthest from the terminal (i.e., distal extremity of bundle) are longest. The cylindrical portion 12 of each terminal is preferably located in the center of the tabs 28 joined thereto such that half the tabs are joined to one side of the portion 12 and half the tabs on the other side. the outermost or end tabs 28 of each bundle are actually much longer than is needed to connect the corresponding element to the bundle. The extra length is provided in the end tabs to permit their folding over and back upon themselves at least once (preferably three times) such that the welding electrodes 30 contact the folded portion 32 rather than the main body of the tabs 28 from which the folds 32 stem.

In a preferred embodiment of the method, the several tabs 28 are first welded to each other and then in a separate operation welded to the cylindrical portion 12. In this embodiment, both end tabs of each bundle are folded over during welding to insure adequate bonding of the end tabs. In the alternative, the tabs 28 may be welded together and to the portion 12 in a single operation in which case the tabs 28 contiguous the portion 12 need not be folded over as the high resistance line contact junction 34 insures adequate bonding at the portion 12. Regardless of the method used, the welding electrodes are pressed against the folds 32 during welding and when so welded, the outermost tabs are bonded so well that manual tensile loads applied by a 180 lb. man serves only to break the tab — not the weld.

the invention is considered useful with any combination of metals known to be resistance weldable. While similar metals would be the norm, dissimilar metals should also work so long as their respective melting points do not differ too greatly and the weldment formed is an alloy of the two. Hence, such combinations as Bi—Sn, Bi—Pb, Bi—Cd, Cd—Sn, Pb—Sn, Te—Zn, Al—Mg, Mg—Sb, Ag—Ge, Ag—Au, Ag—Ca, Au—Ge, Au—Ca, Cu—Ge, Co—Ni, Co—Fe, Co—Po, Fe—Po, Fe—Ni, Ni—Pd, Pt—V and Ti—V, among others, are considered acceptable.

In one example of the invention, nickel tabs are welded to nickel terminals in the assembly of a Ni—Zn battery. the depending cylindrical portion 12 has a diameter of 4.3 mm and is welded to a bundle of sixteen tabs such that there are eight tabs on each side of the cylindrical portion 12. the tabs are 0.2 mm thick and 6.35 mm wide with sufficient length to provide the arrangement shown in the drawings. The outermost tabs have an additional 12 mm of length and are folded over three times (i.e., 4 mm per fold) in a serpentine fashion to provide three thicknesses of tab metal between the electrode and the stem of the outermost tab. With this arrangement, effective welds are produced (i.e., 180# man test) using the 2S tap setting of a Taylor-Winnfield type EB-2820 20 KVA welder with flat electrodes. The welding cycle is about 60 cycles squeeze, 10 cycles weld and 40 cycles hold with an electrode force of about 425 lbs.

While the invention has been described primarily in conjunction with certain embodiments thereof, it is not intended to be limited thereto but rather only to the extent set forth hereafter in the claims which follow.

the embodiments of the invention in which an exclusive property or privilege is claimed are defined as follows:

1. In a battery including a plurality of active elements, a case for containing said active elements, a terminal for electrically communicating said elements to a load external of said case, and a plurality of foil-like, metal tabs mechanically and electrically connecting said elements with said terminal, said tabs being bundled and welded together at the terminal, the improvement comprising: the end of the tab bundle remote from the terminal comprising a fold from at least one of the tabs near said end, said fold serving to space the outermost tab in the bundle from the welding electrode during resistance welding and thereby promoting welding of the outermost tab in the bundle to the next adjacent, penultimate tab in the bundle.

2. In a battery including a plurality of active elements, a case for containing said active elements, a terminal for electrically communicating said elements to a load external of said case, and a plurality of foil-like, metal tabs mechanically and electrically connecting said elements with said terminal, said tabs being bundled and welded together at the terminal, the improvement comprising: the end of the tab bundle remote from the terminal comprising about three folds from the outermost tab in the bundle, said folds serving to space the outermost tab from the welding electrode during resistance welding and thereby promoting welding of said outermost tab to the next adjacent, penultimate tab in the bundle.

3. In a battery including a plurality of active elements, a case for containing said active elements, a terminal for electrically communicating said elements to a load external of said case, and a plurality of foil-like metal tabs mechanically and electrically connecting said elements with said terminal, said tabs being bundled and welded together at the terminal, the improvement comprising: said terminal including a cylindrical portion extending into said case and welded on its curved surface to one end of the tab bundle and the other end of the tab bundle comprising at least one fold from at least one of the tabs near said other end, said fold serving to space the last tab at said other end from the welding electrode during resistance welding and thereby promoting welding of the last tab to the next adjacent, penultimate tab in the bundle.

4. In the method of electrically and mechanically connecting active elements of a battery and welding them to the battery's terminal, said method including the step of electrical resistance welding a bundle of foil-like, metal, element-connecting tabs together and to said terminal, said bundle having one end for welding to the terminal and another end, remote from the terminal, for engagement with the welding electrode during welding, the improvement comprising: folding over at least one of said tabs near said other end of the bundle such that the fold overlies the last tab at said other end and directly engages the welding electrode during welding to promote improved welding of said last tab to the penultimate tab in the bundle.

5. In the method of electrically and mechanically connecting the active elements of a battery and welding them to the battery's terminal, said method including the step of simultaneously electrical resistance welding a bundle of foil-like, metal, element-connecting tabs together and to said terminal, said bundle having one end for welding to the terminal and another end, remote from the terminal, for engagement with the welding electrode during welding, the improvement comprising: folding over a portion of the last tab at said other end of the bundle such that the fold at least partially overlies the remainder of the last tab at said other end and engages the welding electrode during welding to promote improved welding of said last tab to the penultimate tab in the bundle.

* * * * *